United States Patent [19]

Aftergut et al.

[11] 4,116,861

[45] Sep. 26, 1978

[54] DICHROIC LIQUID CRYSTAL COMPOSITIONS

[75] Inventors: Siegfried Aftergut, Schenectady; Herbert S. Cole, Jr., Scotia, both of N.Y.

[73] Assignee: General Electric Company, Schenectady, N.Y.

[21] Appl. No.: 825,660

[22] Filed: Aug. 18, 1977

[51] Int. Cl.$^2$ .......................... C09K 3/34; G02F 1/13
[52] U.S. Cl. ..................................... 252/299; 260/155; 260/156; 260/164; 260/178; 350/349
[58] Field of Search ............................... 252/299, 408; 350/160 LC, 349, 350; 260/178, 156, 155, 164

[56] References Cited

U.S. PATENT DOCUMENTS

| | | | |
|---|---|---|---|
| 3,703,329 | 11/1972 | Castellano | 252/299 |
| 3,833,287 | 9/1974 | Taylor et al. | 252/299 |
| 3,960,751 | 6/1976 | Moriyama et al. | 252/299 |
| 4,032,219 | 6/1977 | Constant et al. | 252/299 |

FOREIGN PATENT DOCUMENTS

| | | | |
|---|---|---|---|
| 2,627,215 | 1/1977 | Fed. Rep. of Germany | 252/299 |
| 1,459,046 | 12/1976 | United Kingdom | 252/299 |

OTHER PUBLICATIONS

Blinov, L. M., et al., J. Phys. (Paris), vol. 36, C-1, No 3, pp. 69–76 (1975).
Constant, J., et al., "Pleochroic Dyes with High Order Parameters," presented at 6th Int. Liq. Cryst. Conf. Kent, Ohio (Aug. 27, 1976).
White, D. L., et al., J. Appl. Physics, vol. 45, No. 11, pp 4718–4723 (1974).
Uchioa, T., et al., Mol. Cryst. Liq. Cryst. (Lett), pp 153–158 (4/29/77).
Gray, G. W., et al., Liq. Cryst. & Plastic Cryst., vol. 1 J. Wiley & Sons, N.Y., pp. 110–111 (1974).
Bloom, A., et al., Mol. Cryst. Liq. Cryst. (Lett.), vol. 41 pp. 1–4 (1977).
Bloom, A., et al., Mol. Cryst. Liq. Cryst., vol. 40, pp 213–221 (1977).

*Primary Examiner*—Benjamin R. Padgett
*Assistant Examiner*—T. S. Gron
*Attorney, Agent, or Firm*—Geoffrey H. Krauss; Joseph T. Cohen; Marvin Snyder

[57] ABSTRACT

Dichroic liquid crystal compositions for use in displays are mixtures of a liquid crystal host material and at least one of a plurality of stilbene-derivative dichroic dyes each having a vinylidene (—CH=CH—) group and a high order parameter. The dichroic liquid crystal compositions each provide a contrast ratio on the order of 10:1.

4 Claims, No Drawings

DICHROIC LIQUID CRYSTAL COMPOSITIONS

BACKGROUND OF THE INVENTION

The present invention relates to dichroic liquid crystal mixtures and particularly to novel mixtures of a liquid crystal host material and at least one of a plurality of dichroic dyes with each dye having a molecule with a vinylidene group and with the liquid crystal mixture providing contrast ratios on the order of 10:1.

A display, particularly one of the liquid crystal type, can be characterized by brightness and contrast performance criteria. It is known to improve these performance criteria by dissolving a guest dichroic dye in a host liquid crystal material. Many dyes have been especially developed for a variety of applications such as dyeing of fabrics, printing of textiles, coloring of plastics, color image formation in photography, etc. To provide the requisite properties, such as hue, solubility, affinity for the substrate, chemical resistance, and compatibility with the medium from which the dye is applied, the molecular structure of the dye is specially designed for each application. Important dye properties required for the present application in liquid crystal displays, include the following: dichroism, solubility and high order parameter.

Dichroism is the property whereby an oriented assembly of dye molecules exhibit relatively low absorption of a given wavelength of light in one state of orientation and a relatively high absorption of the same wavelength in another state of orientation with respect to the light source. The orientation can be brought about by dissolution of the dye in a liquid crystal solvent or by embedding the dye in a stretched plastic.

Solubility must be sufficiently high so that thin layers, for example, of ten micrometers, have adequate light absorption in one of the oriented states. Ionic dyes will generally be inadequate not only because of their low solubility but also because they increase the electrical conductivity of liquid crystals.

Order parameter is a quantitative measure of the degree of molecular order or alignment in a given system. High order parameter is promoted by dyes with elongated shape having a large ratio of molecular length to breadth, similar to the shape of the molecules of liquid crystal host material. To insure an elongated shape, the molecules should have a rigid structure which can be obtained, for example, by linking benzene or heterocyclic rings with double bonded groups. The brightness and contrast are both related to the order parameter S of the dye, where $S = (R-1)/(R+2)$ and R is the ratio of light absorption in the dye measured with a polarizer respectively parallel and perpendicular to the nematic director of the liquid crystal host at the wavelength of maximum absorption. Advantageously, the order parameter should be at least 0.65, and preferably as high as possible, to achieve a minimum desired contrast ratio on the order of 10:1, while still allowing a liquid crystal guest-host display to be fabricated with a reasonable brightness parameter.

BRIEF SUMMARY OF THE INVENTION

In accordance with the invention, a dichroic liquid crystal composition comprises a host liquid crystal material in which is dissolved at least one of plurality of stilbene-derived guest dichroic dyes of the general structure

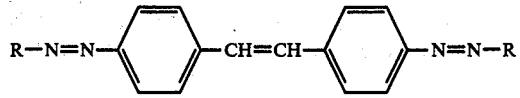

Each dichroic dye has an order parameter S of at least 0.65 and comprises a relatively elongated and rigid molecule having a vinylidene moiety linking cyclic substituents and having chromophoric end groups (auxochromes), e.g., electron-withdrawing groups or electron-repelling groups imparting a characteristic color thereto by absorption over a specific portion of the visible light spectrum.

A first preferred dichroic liquid crystal composition is formed by the guest dichroic dye (4,4'-bis(4-N,N-dimethylaminonaphthylazo)stilbene dissolved in the liquid crystal host material; the mixture has an order parameter of about 0.74 and a maximum absorption wavelength of about 490 Nanometers (nm.), and the dichroic dye imparts an orange-red color to the composition when acting upon white light.

Other preferred dichroic liquid crystal compositions have dissolved, in a host liquid crystal material, one or more of a plurality of guest dichroic dyes, including: 4,4'-bis(4-N-methylaminonaphthylazo)stilbene (with an order parameter of about 0.65 and a maximum absorption wavelength of about 495 nm.); 4,4'-bis(4-N-ethylaminonaphthylazo)stilbene (with an order parameter of about 0.76 and a maximum absorption wavelength of about 495 nm.); 4,4'-bis(4-N,N-dimethylamino-2,6-dimethylphenylazo)stilbene (with an order parameter of about 0.65 and a maximum absorption wavelength of about 470 nm.); 4,4'-bis(4-piperidinophenylazo)stilbene (with an order parameter of about 0.65 and a maximum absorption wavelength of about 450 nm.); 4,4'-bis(8-amino-5-quinolinoazo)stilbene (with an order parameter of about 0.65 and a maximum absorption wavelength of about 450 nm.); 4,4'-bis-(8-julolidinoazo)stilbene (with an order parameter of about 0.65 and a maximum absorption wavelength of about 470 nm.); 4,4'(4-hydroxynaphthylazo)stilbene (with an order parameter of about 0.65 and a maximum absorption wavelength of about 480 nm.); 4,4'-bis(4-N,N-dimethylaminophenylazo)stilbene (with an order parameter of about 0.70 and a maximum absorption wavleength of about 440 nm.); 4,4'-bis(4-aminonaphthylazo)stilbene (with an order parameter of about 0.65 and a maximum absorption wavelength of about 500 nm.); 4,4'-bis(1,2,3,4-tetrahydro-6-carbazole-azo)stilbene (with an order parameter of about 0.65 and a maximum absorption wavelength of about 450 nm.); and 4,4'-bis(4,5-diaminonaphthylazo)stilbene (with an order parameter of about 0.65 and a maximum absorption wavelength of about 540 nm.).

Accordingly, it is an object of the present invention to provide novel dichroic liquid crystal compositions having at least one dichroic dye of the stilbene type and having an order parameter of at least 0.65.

This and other objects of the invention will become apparent from a consideration of the following detailed description.

DETAILED DESCRIPTION OF THE INVENTION

Liquid crystal displays of the host liquid crystal-guest dichroic dye type require a dichroic liquid crystal mixture having as high a value of order parameter S as possible, to obtain high contrast ratios. Towards this end, we have synthesized a plurality of dichroic liquid crystal mixtures each comprising a liquid crystal material, preferably of the positive dielectric anisotropy type, having dissolved therein at least one of a plurality of dichroic dyes each of the 4,4'-(substituted azo)stilbene genus with general structure dimethylaminonaphthylazo)stilbene having, a chemical formula

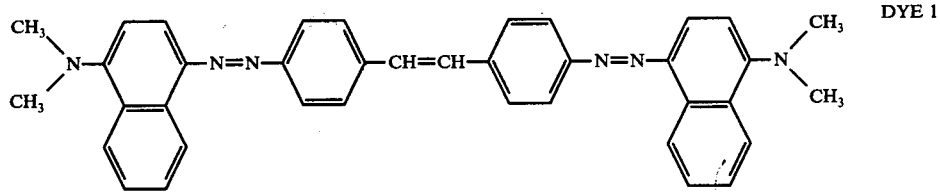
DYE 1

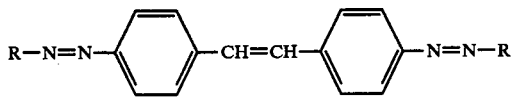

and characterized by an order parameter S of at least 0.65 and by a maximum absorption wavelength in the range from about 450 nm. to about 540 nm., whereby a dichroic dye guest-liquid crystal host display cell generally having colors in the yellow-red portion of the visible spectrum may be provided with contrast ratios (i.e., the ratio of the light observable in the brighter condition to the light observable in the darker condition) on the order of 10:1.

The order parameter values for the novel dichroic liquid crystal compositions set forth hereinbelow are measured by dissolving approximately 0.5% by weight of one of the preferred dichroic dyes disclosed hereinbelow in a host nematic liquid crystal. One host is E-7 or E-8 biphenyl liquid crystal (available from BDH, Ltd.) which nematic mixture possesses a large mesophase range, although other host liquid crystal compounds may be equally as well utilized.

A test cell was constructed utilizing indium-oxide-coated glass substrates having surfaces coated with obliquely evaporated silicon oxide orientation layers, utilizing an incidence angle of 60° with respect to the substrate surface normal. The orientation layers provide unidirectional alignment of the molecules of the liquid crystal material and, generally, of the dichroic dye, parallel to the substrate planes. A 25 micron thick layer of the liquid crystal host-guest dye mixture is sealed between the substrates and order parameter is calculated from the measurement of light absorption with a polarizer respectively parallel and perpendicular to the nematic director of the liquid crystal material.

We have found that a first preferred dichroic liquid crystal mixture utilizes the dichroic dye 4,4'-bis(4-N,N-dissolved in the aforementioned host nematic liquid crystal composition. This first dye is synthesized by tetrazotizing 2.82 grams of stilbenediamine dihydrochloride in a mixture of 9 milliliters of concentrated hydrochloric acid and 45 milliliters of water. The temperature of the resulting mixture is maintained at a temperature of 0° C. while 1.4 grams of sodium nitrite is added. After approximately two hours at 0° C., resulting clear tetrazonium salt is coupled with about 3.4 grams of N,N-dimethyl-1-naphthylamine in acetic acid at a reaction temperature of about 5° C. The coupling reaction occurs substantially instantaneously and the reaction product is then neutralized with potassium carbonate and a precipitated product is collected on filter paper and re-crystallized from pyridine. The order parameter of the dichroic liquid crystal mixture using the aforementioned dichroic dye number 1 compound was found to be on the order of 0.74, while the maximum absorption wavelength is found to be approximately 490 nm., whereby the dye imparts a generally red-orange color to the liquid crystal compound in a display.

Additional presently preferred dichroic liquid crystal compositions utilize other guest dichroic dyes of the stilbene-type. These dyes are synthesized as described above, with the tetrazotized stilbenediamine being coupled with one of: N-methyl-1-naphthylamine; N-ethyl-1-naphthylamine; N,N-3,5-tetramethylaniline; N-phenylpiperidine; 8-aminoquinoline julolidine; 1-naphthol; N,N-dimethylaniline; 1-naphthylamine; 1,2,3,4-tetrahydrocarbazole; or 1,8-diaminonaphthalene.

Another preferred dichroic liquid crystal composition uses the dichroic dye 4,4'-bis(4-N-methylaminonaphthylazo)stilbene having a chemical formula

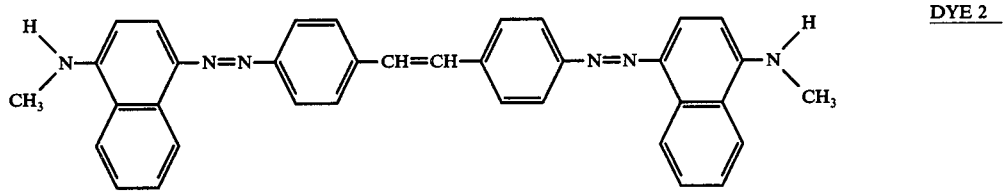
DYE 2 and produced by coupling with N-methyl-1-naphthylamine.

This liquid crystal composition has an order parameter of S=0.65 and a maximum absorption wavelength of about 495 nm., whereby a red color is imparted to the guest-host liquid crystal material in a display.

Another preferred dichroic dye for use in a dichroic liquid crystal composition is produced by coupling with N-ethyl-1 naphthylamine and is 4,4'-bis(4-N-ethylaminonaphthylazo)stilbene, having a chemical formula

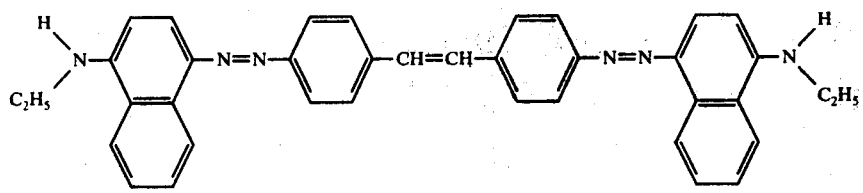

DYE 3 with the dichroic liquid crystal composition utilizing this dye having an order parameter S of about 0.76 and a maximum absorption wavelength of about 495 nm., whereby a liquid crystal display having a red color may be fabricated.

whereby a display having a yellow color may be fabricated.

The dye synthesized by coupling with 8-aminoquinoline is 4,4'-bis(8-amino-5-quinolinazo)stilbene, having a chemical formula

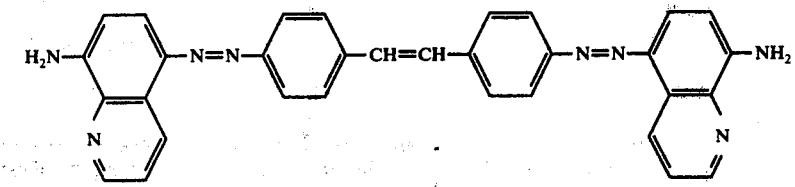

DYE 6

The dichroic dye synthesized using the coupler N,N-3,5-tetramethylaniline is 4,4'-bis-(4-N,N-dimethylamino-2,6-dimethylphenylazo)stilbene having the chemical formula having an order parameter on the order of 0.65 and a maximum absorption wavlength of about 450 nm., whereby a display having a yellow-orange color may be fabricated.

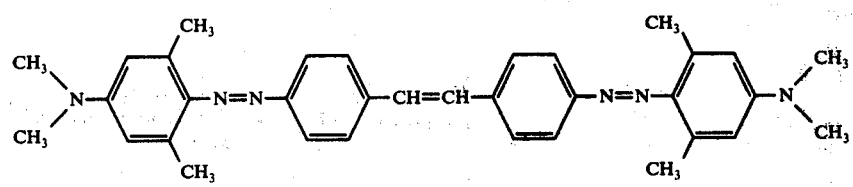

DYE 4 and having an order parameter of about 0.65 and a maximum absorption wavelength of about 470 nm., whereby a display having an orange color may be fabricated.

The dichroic dye synthesized by coupling with julolidine is 4,4'-bis(8-julolidinoazo)stilbene, having a chemical formula

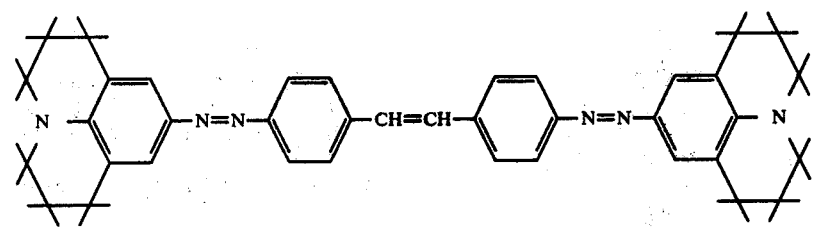

DYE 7 cated.

The dichroic dye synthesized by coupling with the N-phenylpiperidine coupler is 4,4'-bis(4-piperidinophenylazo)stilbene having a chemical formula having an order parameter of about 0.65 and a maximum absorption wavelength of about 470 nm., whereby a display having an orange-red color may be fabricated The dye synthesized by coupling with 1-naphthol is

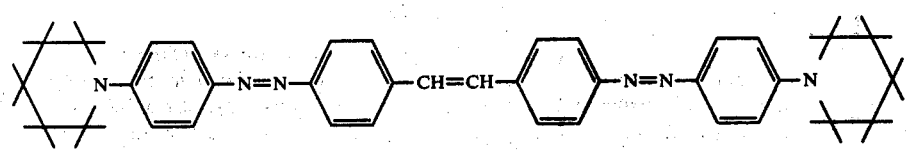

DYE 5 having an order parameter on the order of 0.65 and a maximum absorption wavelength of about 450 nm., 4,4'-bis(4-hydroxynaphthylazo)stilbene, having a chemical formula

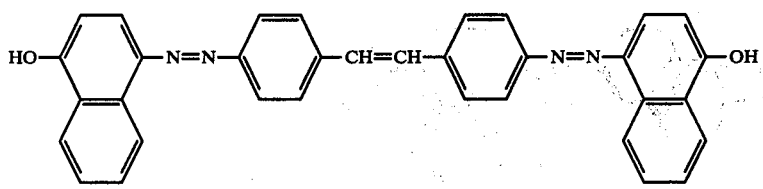

DYE 8 having an order parameter of about 0.65 and a maximum absorption wavelength of about 480 nm., whereby a display having a red color may be fabricated.

Another dichroic dye is synthesized by coupling with N,N-dimethylaniline and is 4,4'-bis(4-N,N-dimethylaminophenylazo)stilbene, having a chemical formula

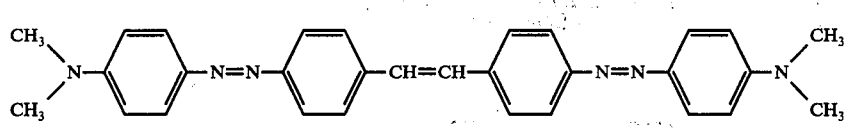

DYE 9 having an order parameter of about 0.70 and a maximum absorption wavelength of about 440 mm., whereby a display having a yellow color may be fabricated.

Still another dichroic liquid crystal composition utilizes a dichroic dye prepared by coupling with 1-naphthylamine. The dye is 4,4'-bis(4-aminonaphthylazo)stilbene, having a chemical formula

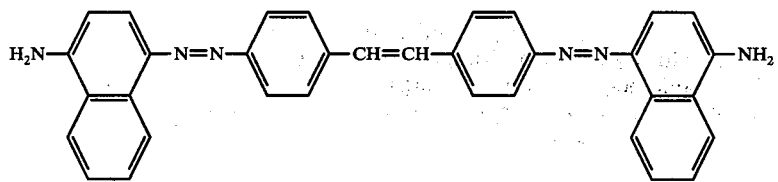

DYE 10 having an order parameter of about 0.65 and a maximum absorption wavelength of about 500 mm., whereby a display having a red color may be fabricated.

Yet another preferred dichroic liquid crystal composition has dissolved therein a dichroic dye, synthesized by coupling with 1,2,3,4-tetrahydrocarbazole. This dye is 4,4'-bis(1,2,3,4-tetrahydro-6-carbazole-azo)stilbene, having a chemical formula

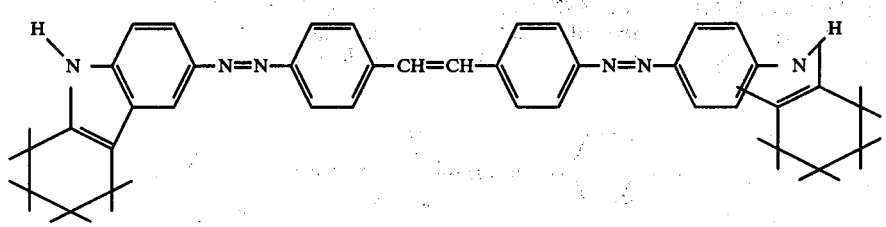

DYE 11 and having an order parameter of about 0.65 and a maximum absorption wavelength of about 450 nm., whereby a display having a yellow color may be fabricated.

A further preferred dichroic liquid crystal composition uses the dye (synthesized by coupling with 1,8-diaminonaphthalene) 4,4'-bis(4,5-diaminonaphthylazo)stilbene, having a chemical formula

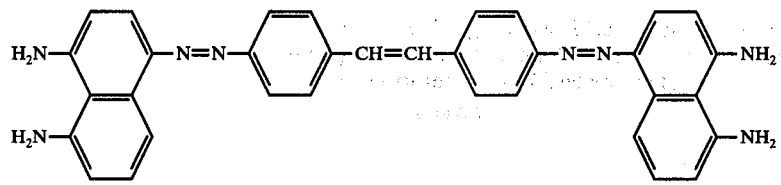

DYE 12 and having an order parameter of about 0.65 and a maximum absorption wavelength of about 540 nm., whereby a display having a red-violet color may be fabricated.

As already mentioned hereinabove, the dichroic liquid crystal compositions comprise a dichroic dye dissolved in a liquid crystal host. Depending on the electro-optic effect to be utilized, the host can be a nematic or cholesteric liquid crystal. Suitable nematic liquid crystals are a mixture of 70%, by weight of p-pentylphenyl 2-chloro-4-(p-pentylbenzoxyloxy)benzoate (Eastman Organic Chemicals EK-11650) and 30%, by weight, of a mixture of esters available from E. M. Merck and Co. as compound ZL1-389, the biphenyl liquid crystals such as the afore-mentioned E-7 and E-8 materials from BDH, Ltd., Schiff base materials such as mixtures of MBBA and p-ethoxybenzylidene-p-aminobenzonitrile, esters available from Merck Company and Hoffman LaRoche Company, and phenylcyclohexanes and azoxy mixtures available from Merck Company. Suitable cholesteric liquid crystals can be made by incorporating optically active compounds in any of the above nematic liquid crystals.

There has just been described a group of 12 different dichroic liquid crystal compositions each having a dichroic dye, structured with multiple-azo bonding groups, dissolved therein to achieve an order parameter S of at least 0.65 to provide a contrast ratio on the order of 10:1 when the dichroic liquid crystal composition is used in a liquid crystal display.

While the present invention has been described with reference to several preferred embodiments thereof, many variations and modifications will now become apparent to those skilled in the art. In particular, other liquid crystal materials such as the esters claimed in U.S. Pat. No. 3,984,344, issued Oct. 5, 1976, the biphenyl materials available from BDH Chemicals, the phenylcyclohexane materials (several of which are commercially available from Merck Co.,) and the like — may be equally advantageously utilized with the dyes hereinabove described to achieve similar magnitudes of order parameter S. Similarly, other dichroic mixtures may be dyes formulated by coupling, as above, with stilbenediamine couplers such as
N,N-dimethyl-m-toluidine, N,N-diethyl-m-toluidine
N,N-diethylnaphthylamine, m-chloroaniline,
2,5-dimethylaniline, N-phenylmorpholine,
N,N-diethylaniline, m-toluidine, 2-naphthol,
1-phenylpiperazine, 1,2,3,4-tetrahydroquinoline,
N-methylaniline and N-ethylaniline.

It is our intent, therefore, to be limited not by the scope of the present disclosure herein, but only by the scope of the appended claims.

What is claimed is:

1. A dichroic liquid crystal composition for use in a liquid crystal display, comprising:
   a host liquid crystal material; and
   a guest dichroic dye exhibiting high order parameter values in said host, wherein the dichroic dye is selected from the group consisting of compounds of the chemical formula

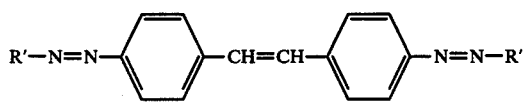

where the radical R' is selected in accordance with a desired approximate maximum absorption wavelength ($\lambda$) from the following table:

TABLE

| DYE | R' | $\lambda$(nm.) |
|---|---|---|
| 1 | N(CH$_3$)$_2$-naphthyl | 490 |
| 2 | NH(CH$_3$)-naphthyl | 495 |
| 3 | N(H)(C$_2$H$_5$)-naphthyl | 495 |
| 4 | N(CH$_3$)$_2$-2,4,5-trimethylphenyl | 470 |
| 5 | N-piperidinyl-phenyl | 450 |
| 6 | 8-amino-quinolinyl | 450 |
| 7 | N-piperidinyl-phenyl | 470 |
| 8 | 4-hydroxy-naphthyl | 480 |
| 9 | N(CH$_3$)$_2$-phenyl | 440 |

TABLE-continued

| DYE | R' | λ(nm.) |
|---|---|---|
| 10 | 1-aminonaphthalene (H₂N on naphthalene) | 500 |
| 11 | 1,2,3,4-tetrahydro-substituted carbazole (N-H) with methyl | 450 |
| 12 | 1,8-diamino-naphthalene with methyl (H₂N, H₂N on naphthalene) | 540 |

2. A dichroic liquid crystal composition as set forth in claim 1, wherein said host liquid crystal material is a nematic liquid crystal material.

3. A dichroic liquid crystal composition as set forth in claim 2, wherein said host liquid crystal material has a positive dielectric anisotropy.

4. A dichroic liquid crystal composition as set forth in claim 3, wherein about 0.5% by weight of said dichroic dye is dissolved in said liquid crystal material.

* * * * *